United States Patent Office 3,359,725
Patented Dec. 26, 1967

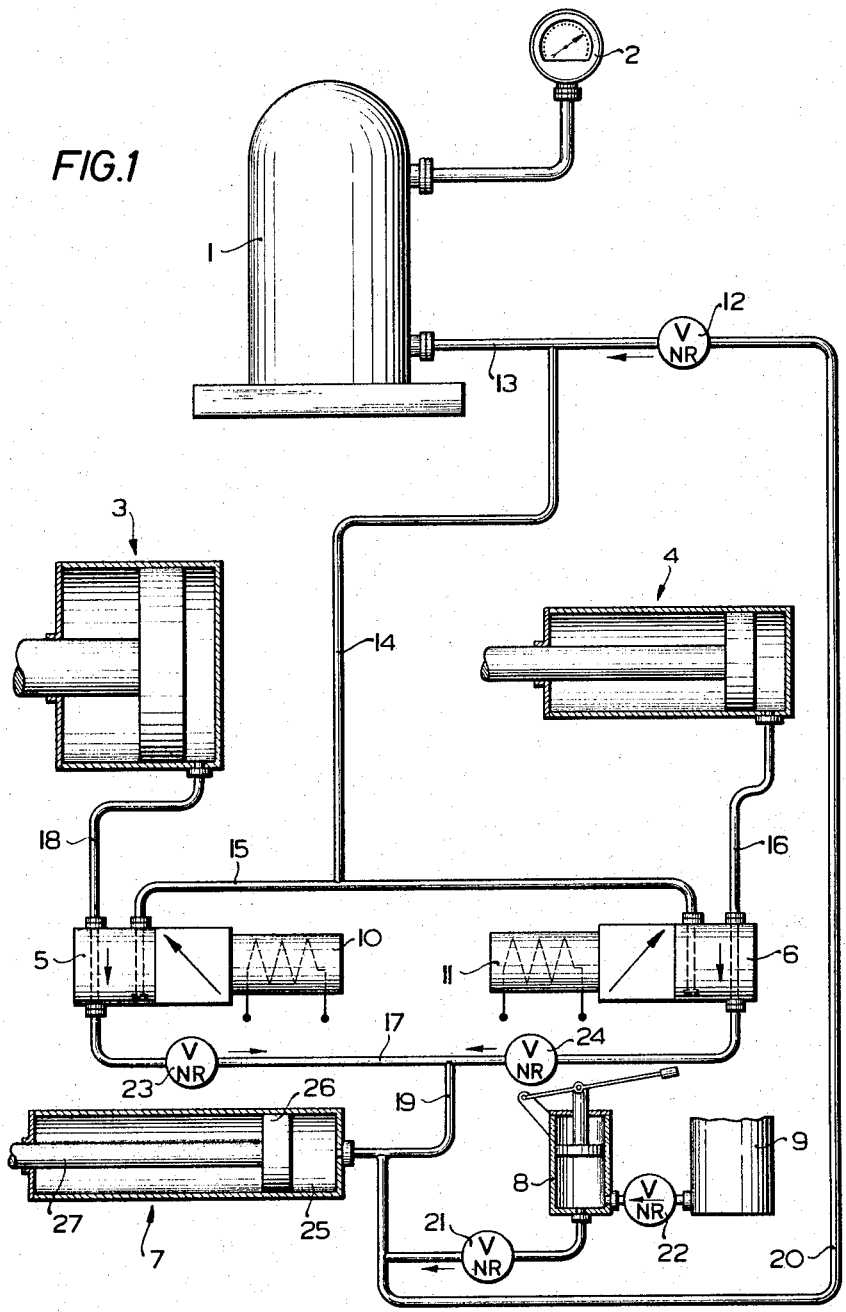

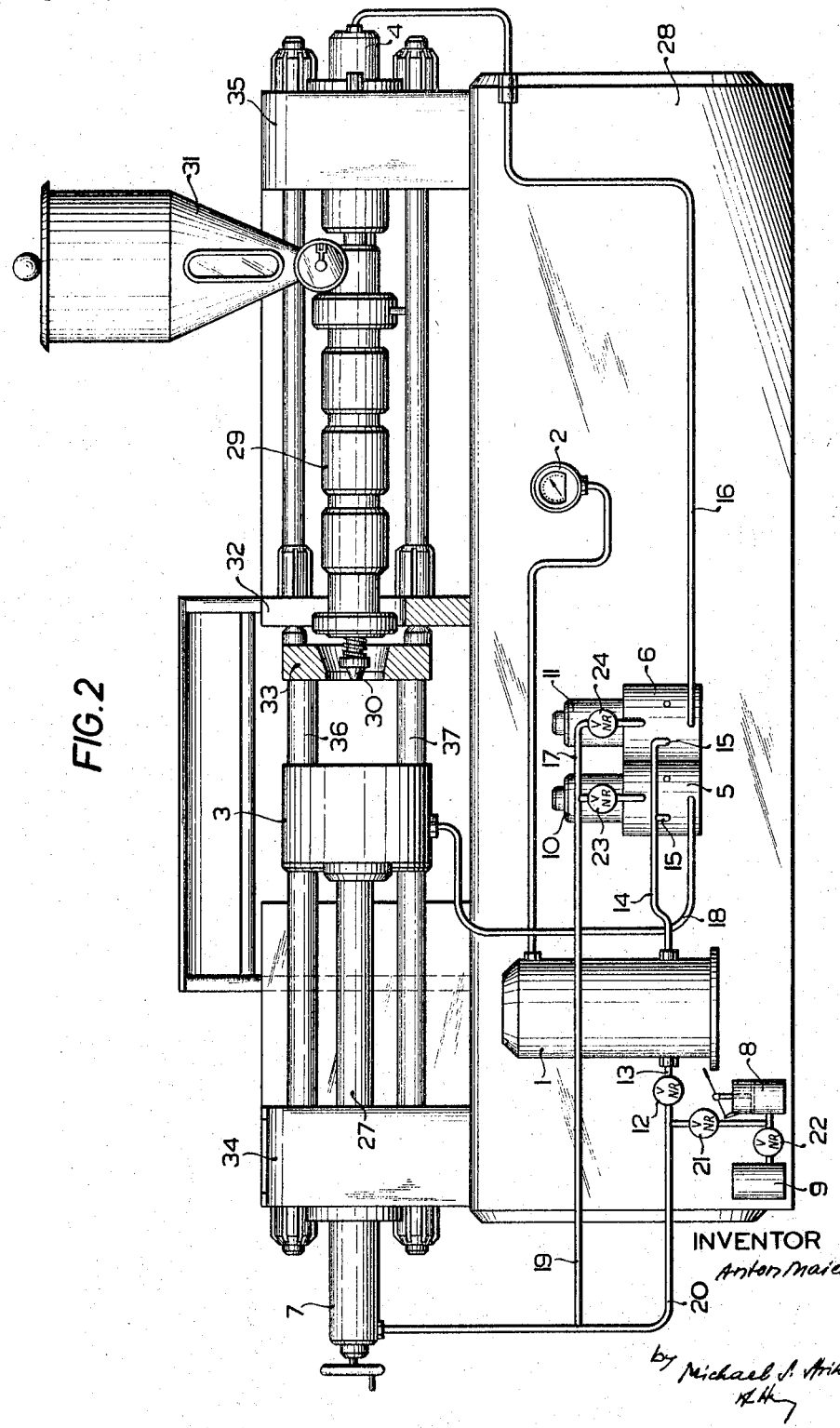

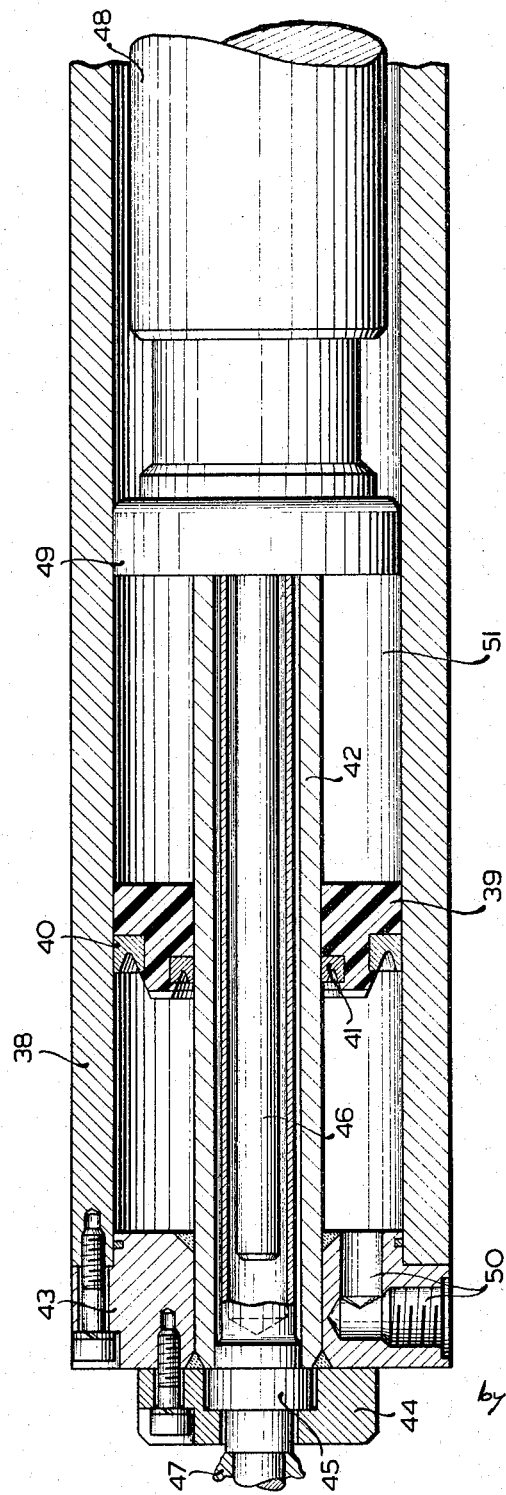

3,359,725
HYDRAULIC DRIVE FOR MACHINES
Anton Maier, Kircheim-Teck, Lindorf, Germany
Filed Sept. 8, 1965, Ser. No. 485,813
Claims priority, application Germany, Oct. 31, 1964,
M 62,955; Dec. 18, 1964, M 63,554
10 Claims. (Cl. 60—51)

ABSTRACT OF THE DISCLOSURE

A hydraulic drive for use in machine tools, comprises a tank for storage of operating fluid, one or more hydraulic units arranged to receive fluid from the tank in the course of an operating cycle, means for controlling the operating cycle, and a pressure generator which returns fluid into the tank and comprises means for receiving from the hydraulic unit or units fluid which is used during a cycle and means for returning such fluid into the tank whereby the fluid used during a preceding cycle can be so returned to the tank prior to start of the next-following cycle. This reduces the quantity of fluid which is needed to maintain the tank in operating condition and enhances the safety of the operation.

---

This invention concerns a hydraulic drive for machine tools, e.g. injection moulding machines for converting thermoplastic compounds, having closed hydraulic circulation, in which controls for the working positions of the machine tool, a pressure storage tank for the operating fluid and a pressure generator for returning the operating fluid into the pressure storage tank are adapted to be incorporated.

In known drives of this kind the pressure generator for returning the operating fluid into the pressure storage comprises a rotary pump. Such rotary pumps for their operation require containers having a relatively large storage supply of operating fluid and a pressure regulating installation between the pressure storage tank and the pump. The increase of temperature consequently involved in the operating fluid during operation leads to diverse disadvantages, e.g. rapid leakages at the packings.

These deficiencies are minimized in accordance with the invention by the fact that the pressure generator is adapted as a cylinder unit, which after the run-off of a working cycle returns the quantity of working fluid used during this working cycle into the pressure storage tank before the beginning of the subsequent working cycle. By this means the advantage is obtained that a substantially smaller quantity of fluid is required than in known drives for maintaining the operational readiness of the pressure storage tank. Furthermore greater operational safety is obtained and a lower technical outlay required.

In an embodiment of the invention the piston is freely carried in the pressure generator cylinder. The free arrangement of the piston ensures greater operational safety as the formation of air inclusions in the operating fluid is prevented.

A further improvement according to the invention is obtained by the fact that the pressure stroke of the piston of the pressure generation occurs in an operating section, e.g. the idling stroke of the machine tool, wherein the latter consumes only little mechanical energy. This prevents a considerable expenditure of energy by the pressure generator.

The invention is further characterized by the fact that the pressure generator comprises a closed collecting container, the volume of which corresponds to that of the quantity of fluid used in one working cycle, and a pump incorporated between the collecting container and the pressure storage tank. This embodiment is particularly suited for large machines.

Further improvement is obtained according to the invention by the fact that the apparatus for returning the working fluid, expended after an operating cycle into the pressure storage tank of the hydraulic driving system, is in the form of a cylindrical unit with a free piston. This provides the advantage that the filling space of the cylinder is each time adapted to the volume of liquid expended in one operation. The passage of air from the other end of the cylinder, between the cylinder wall and the piston, into the filling space is also prevented. This causes the operational reliability of the return device and of the whole hydraulic system to be increased.

A convenient feature in such an apparatus is that the free piston is guided in sealed relationship within the cylinder on a stationary sleeve, the cavity of which accommodates an ejector possibly required. The free piston is preferably made wholly or partly of plastic material.

A further improvement according to the invention is obtained by the fact that on the filling end of the cylinder a pump is connected which conveys the working fluid collected in the filling space of the cylinder from a previous operation into the pressure storage tank. The arrangement may thus be such that on or in the cylinder or on the machine one or more switching members are arranged, which the free piston at the end of its emptying and/or filling stroke actuate, causing shutting down or restarting the pump.

Several embodiments of the invention are illustrated by way of example in the accompanying drawings in which:

FIG. 1 is a schematic view of a first embodiment.

FIG. 2 shows partly in elevation and partly in section an injection moulding machine embodying the invention.

FIG. 3 is a longitudinal section through an alternative return device which is constructed in the form of a cylinder with a free piston.

Figure 4A:
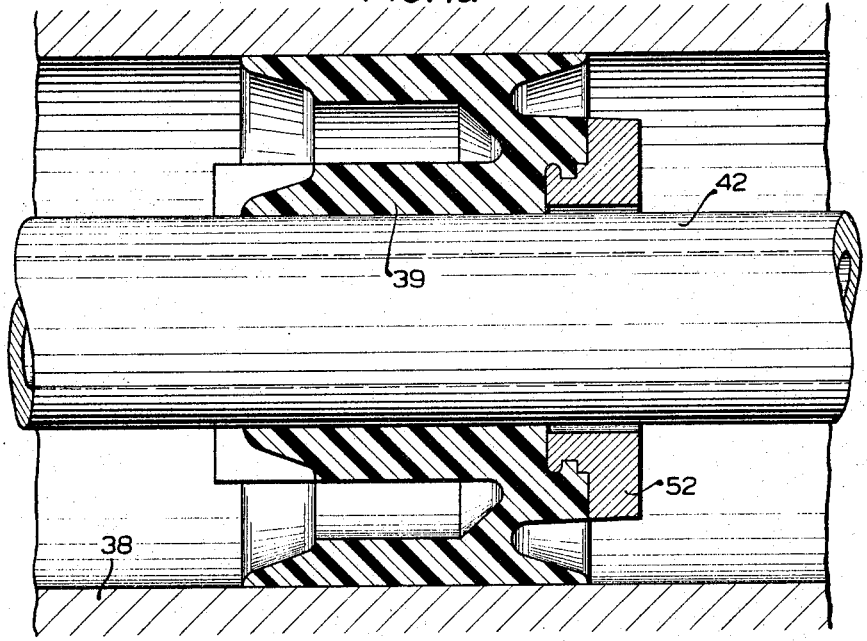
FIG. 4 illustrates on a larger scale a cross-section through the free piston of the cylinder unit in accordance with FIG. 3.

The injection moulding machine illustrated in FIGS. 1 and 2 comprises a supporting frame 28, a plasticizing cylinder 29 with injection nozzle 30, a material feed hopper 31, supporting plates 32, 33, 34, 35 and supports 36, 37.

Two working positioners 3, 4 are connected to a pressure storage tank 1 having a manometer 2. The working positioner 3 corresponds to the closing device and the working positioner 4 performs the function of the injection screw of an injection moulding machine. The working positioner 3 is operated by means of a control valve 5 and the working positioner 4 via a control valve 6. The two controls 5 and 6 are formed as valves which are controlled by means of electro-magnets 10, 11.

The operating fluid circulates in pipe lines 13, 14, 15, 16, 17, 18. Associated therewith are a pipe 19, which leads to a pressure generator 7, and a return pipe 20.

Connected to the return pipe 20 via a non-return valve 21 is a manually operated filling device 8 which is connected with a liquid storage container 9. Between the filling device 8 and the liquid storage container 9 a non-return valve 22 is arranged. Between the pipe 17 and pipe 16 a non-return valve 24 is provided. Between the return pipe 20 and the pipe 13 leading to the pressure storage tank 1 a non-return valve 12 is provided.

The pressure generator 7 comprises a closed cylinder 25 and a piston 26, the driving rod 27 of which is adapted to be controlled by an optional source of power.

It is assumed that the closing device 3 is to be shifted from the position of readiness into the closing position (the piston within 3 moved to the left in FIG. 1). In this case the control valve 5 receives an impulse via the electro-magnet 10. This impulse causes communication between the pressure pipe 15 and the pipe 18. By this means the closing position of the closing device 3 is obtained and subsequently the closing device remains closed. The control valve 6 then receives an impulse which connects the pressure pipe 15 with the pipe 16 and initiates the injection operation (the piston in 4 moved to the left in FIG. 1). On completion of the injection operation the electric supply to the control valve 6 ceases. The pipe 16 is connected to the pipe 17 by means of the non-return valve 24. This permits communication with the pressure generator 7 via the pipe 19. Then the impulse exerted on the control valve 5 ceases. The pipe 18 is connected to the pipe 17 via the non-return valve 23 is also connected to the pressure generator 7 via the pipe 19.

After the fluid supply used in the closing device 3 and the injection device 4 has accumulated in the pressure generator 7, before the beginning of the subsequent working cycle, the thus collected fluid supply is forced into pipe 20, due to movement of piston 26 to the right (FIG. 1) in cylinder 25, and passes via the non-return valve 12 and the pipe 13 into the pressure generator 1. This concludes a working cycle.

In place of the pressure generator 7 shown a pressure generator may be used comprising a closed collecting container and a pump.

By means of the filling device 8 pressure fluid may be recharged from the storage container 9 by hand into the pressure generator 7, if for any reason a loss of pressure fluid has occurred.

Figure 4B:
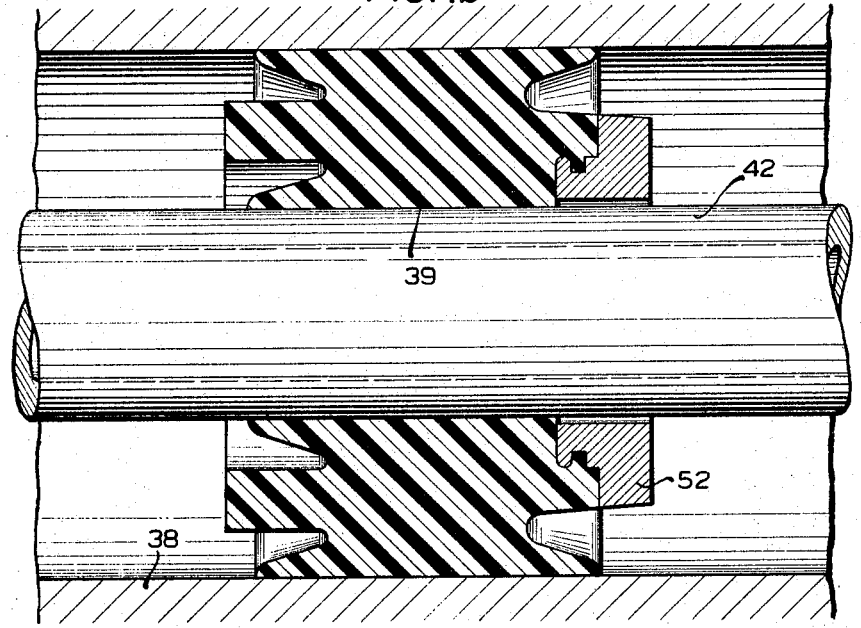

The return device illustrated in FIGS. 3 and 4 comprises a cylinder 38 and a piston 39 freely arranged therein. The piston 39 is sealed relative to the inner wall surface and relative to a sleeve 42 by means of the collars 40, 41. The sleeve 42 is secured in the cylinder cover 43. In the present case sleeve 42 is welded to the cover 43. Mounted on the cover 43 is a holder 44 for an ejection device 45, 46. To operate the ejection device 45, 46 a hand crank 47 is used. The free piston 39 is made of plastic material. The main driving spindle 48 of the machine projects into cylinder 38. A disc 49 which, when the main driving spindle 48 is reciprocated, acts as guide for the spindle 48, is connected to the main driving spindle 48.

A passage 50 which via a pipe, not shown, is connected with the working positioners and the pressure storage tank of the machine is formed in the cover 43 of cylinder 38. Incorporated in this connecting pipe are the non-return and switch valves necessary for the functioning of the hydraulic system. The non-return and switch valves may be replaced by incorporating a pump in the communicating pipe, which pump forces the working fluid accumulated from a preceding operation in the filling space 51 of the cylinder 38, into a pressure storage container, not shown.

On or in the cylinder 38 or even at any other point of the machine it is possible for one or more switch members to be arranged, which the free piston 39 at the end of its emptying and/or filling stroke actuates causing stopping or restarting of the pump.

The piston 39 fashioned of plastic material on its operating end may be provided with a protective ring 52 which protects the surface of the piston 39.

I claim:
1. A hydraulic drive for machine tools, comprising a pressure storage tank for operating fluid; at least one hydraulic unit arranged to receive operating fluid from said tank in the course of an operating cycle; control means for controlling the operative cycle of the machine tool; and a pressure generator for returning operating fluid into said tank, compressing means for receiving from said hydraulic unit operating fluid used during an operating cycle and means for returning such fluid into said tank whereby the operating fluid used during a preceding cycle can be so returned into said tank prior to start of the next-following operating cycle, said means for receiving operating fluid from said hydraulic unit comprising a cylinder and said means for returning operating fluid into said tank comprising a piston which is free within said cylinder.

2. A hydraulic drive for machine tools, comprising a pressure storage tank for operating fluid, control means for controlling the operating cycle of the machine tool, and a pressure generator for returning operating fluid to said tank, said pressure generator comprising a closed collecting container having a volume sufficient to accommodate operating fluid in amounts used during an operating cycle, and a pump provided between said container and said tank and adapted to return into said tank operating fluid used during a preceding operating cycle prior to start of the next-following cycle.

3. A hydraulic drive for machine tools, comprising a pressure storage tank for operating fluid; at least one hydraulic unit arranged to receive operating fluid from said tank in the course of an operating cycle; control means for controlling the operating cycle of the machine tool; a pressure generator for returning operating fluid into said tank, comprising means for receiving from said hydraulic unit operating fluid used during an operating cycle and means for returning such fluid into said tank whereby the operating fluid used during a preceding cycle can be so returned into said tank prior to start of the next-following operating cycle; and a filling device connected to said pressure generator for charging it with operating fluid.

4. A hydraulic drive for machine tools, comprising a pressure storage tank for operating fluid; at least one hydraulic unit arranged to receive operating fluid from said tank in the course of an operating cycle; control means for controlling the operating cycle of the machine tool; a pressure generator for returning operating fluid into said tank, comprising means for receiving from said hydraulic unit operating fluid used during an operating cycle and means for returning such fluid into said tank whereby the operating fluid used during a preceding cycle can be so returned into said tank prior to start of the next-following operating cycle; and a manual pump connected to said pressure generator for charging it with operating fluid.

5. A hydraulic drive for machine tools, comprising a pressure storage tank for operating fluid, control means for controlling the operating cycle of the machine tool, and a pressure generator for returning operating fluid to said tank, said pressure generator comprising a cylinder the volume of which corresponds to the amount of operating fluid used during an operating cycle, a free piston in said cylinder for returning during low-energy operation of the machine tool into said tank operating fluid used during the preceding operating cycle prior to start of the next-following cycle, a pump installed between said cylinder and said tank, and a manually operated pump for charging said pressure generator with operating fluid.

6. For use in a hydraulic drive for machine tools of the type comprising a pressure storage tank for operating fluid, at least one hydraulic unit which receives from the tank fluid during an operating cycle, and control means for controlling the operating cycle of the machine tool, the improvement which consists in the provision of an apparatus for receiving from the hydraulic unit operating fluid expended by the tank during an operating cycle and for returning such fluid into the pressure storage tank, said apparatus comprising a cylinder and a piston, the piston being freely slidable in the cylinder.

7. For use in a hydraulic drive for machine tools of the type comprising a pressure storage tank for operating fluid and control means for controlling the operating cycle of the machine tool, the improvement which consists in the provision of an apparatus for returning into the tank operating fluid expended during an operating cycle, said apparatus comprising a cylinder, a piston freely slidable in said cylinder, a stationary sleeve carried in the cylinder, said piston being slidable in sealed relationship on said sleeve and said sleeve having a cavity, and an ejector accommodated in said cavity.

8. Apparatus according to claim 6, further comprising a pump connected between the cylinder and the pressure storage tank, and arranged to force operating fluid which collects in the cylinder during a preceding operation back into the pressure storage tank.

9. For use in a hydraulic drive for machine tools of the type comprising a pressure storage tank for operating fluid and control means for controlling the operating cycle of the machine tool, the improvement which consists in the provision of an apparatus for returning into the tank operating fluid expended during an operating cycle, said apparatus comprising a cylinder, a piston freely slidable in said cylinder, a stationary sleeve carried in said cylinder and having a cavity, said piston comprising plastic material and being slidable in sealed relationship on said sleeve, piston operating means remote from the piston for operating the piston, an ejector accommodated in said cavity, a pump installed between said cylinder and the pressure storage tank, and means operable by said piston for actuating said pump so that the pump can force fluid which accumulates in said cylinder back into the pressure storage tank.

10. In a hydraulic drive for machine tools of the type comprising a pressure storage tank for operating fluid and control means for controlling the operating cycle of the machine tool, the improvement which consists in the provision of an apparatus for returning the operating fluid expended after an operation into the pressure storage tank, said apparatus comprising a cylinder, a stationary sleeve carried in the cylinder, a piston freely slidable in sealed relationship in the cylinder on the sleeve, piston operating means remote from the piston for operating the piston, a cavity formed in said sleeve and an ejector accommodated in the cavity, a pump connected to the cylinder and adapted for connection to the pressure storage tank and means operable by the piston for actuating the pump, whereby operating fluid which collects in the cylinder can be forced into the pressure storage tank.

References Cited

UNITED STATES PATENTS

| | | | |
|---|---|---|---|
| 2,361,326 | 10/1944 | Silver | 60—52 |
| 2,715,389 | 8/1955 | Johnson | 92—86 X |
| 2,929,212 | 3/1960 | Lewis et al. | 60—52 |

FOREIGN PATENTS

| | | |
|---|---|---|
| 1,017,530 | 9/1952 | France. |

EDGAR W. GEOGHEGAN, *Primary Examiner.*